United States Patent [19]

Luscher

[11] Patent Number: 4,511,245
[45] Date of Patent: Apr. 16, 1985

[54] MULTIFUNCTION REPROGRAPHIC APPARATUS

[76] Inventor: Fred Luscher, 22, Quai du Cheval-Blanc, 1227 Geneva, Switzerland

[21] Appl. No.: 24,439

[22] Filed: Mar. 27, 1979

[30] Foreign Application Priority Data

Mar. 30, 1978 [CH] Switzerland .......................... 3380/78

[51] Int. Cl.³ .......................... G03B 27/52; G03B 27/70
[52] U.S. Cl. .................................... 355/43; 354/109; 355/60
[58] Field of Search .................................... 355/40–43, 355/8, 46, 55, 57, 60; 354/105, 109

[56] References Cited

U.S. PATENT DOCUMENTS

| 3,059,525 | 10/1962 | Shuftan | 355/43 X |
| 3,523,725 | 8/1970 | Schaeffer | 355/46 X |
| 3,628,430 | 12/1971 | Morse | 355/43 X |
| 3,957,368 | 5/1976 | Goshima et al. | 355/8 |
| 4,027,963 | 6/1977 | Hoppner et al. | 355/8 |
| 4,154,524 | 5/1979 | Hattori et al. | 355/8 X |

Primary Examiner—Richard A. Wintercorn
Assistant Examiner—W. Brady
Attorney, Agent, or Firm—Robert E. Burns; Emmanuel J. Lobato; Bruce L. Adams

[57] ABSTRACT

Multifunction reprographic apparatus comprises a housing having a first window in the front wall of the housing and a second window in the top wall of the housing. A mirror in the housing is pivoted to swing about a horizontal axis between an inclined position in which light from an illuminated original placed on the second window is directed through a lens system onto photosensitive paper positioned in the housing, and a horizontal position in which light from a subject placed in front of the first window is directed by the lens system onto the photosensitive paper. The apparatus is thus operable to make a photocopy of an original placed on the top window or to make a photograph of a person or other subject positioned in front of the front window.

6 Claims, 2 Drawing Figures

MULTIFUNCTION REPROGRAPHIC APPARATUS

FIELD OF THE INVENTION

The present invention relates to multifunction reprographic apparatuses.

BACKGROUND OF THE INVENTION

Photocopying apparatuses which enable one or several copies of the same format or of a different format to be obtained from an original are known.

Photographic apparatuses, automatic or otherwise, which enable, whether in a booth or not, photographs of different format to be taken of a subject are also known.

SUMMARY OF THE INVENTION

According to the invention there is provided a multifunction reprographic apparatus, comprising means enabling a choice of at least one photocopy of an original and at least one photograph of an object to be made.

The present invention may provide a multifunction reprographic apparatus, instantaneous or otherwise, which enables photocopies and photographs of different formats in monochrome or colour, and various types of identity cards to be made according to the user's choice.

The accompanying drawings show an embodiment of the invention diagrammatically and by way of example.

DESCRIPTION OF PREFERRED EMBODIMENTS

Figure 1:
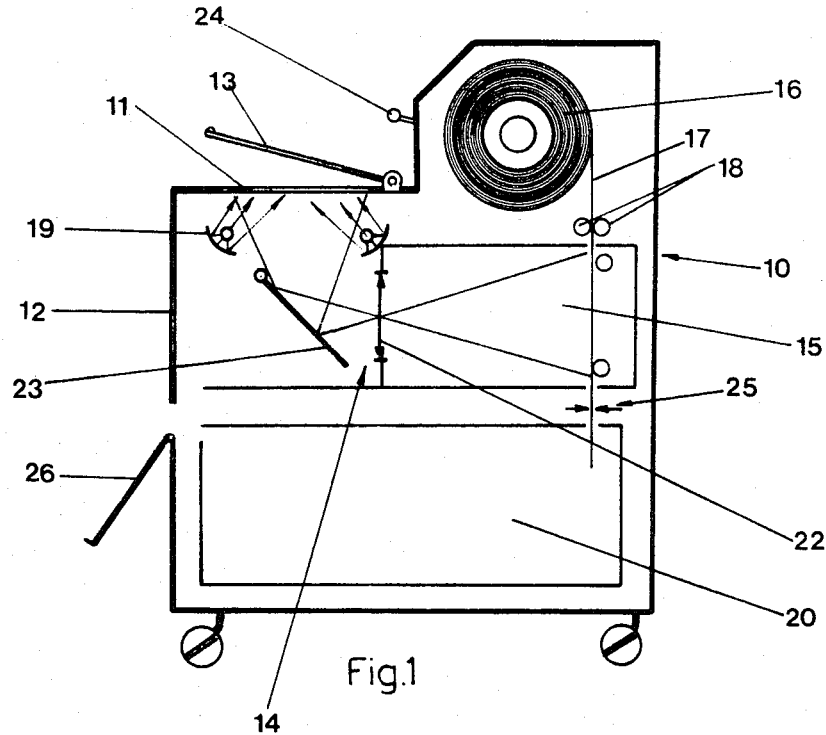
FIG. 1 is a vertical section of a preferred apparatus illustrating operation thereof for producing photocopies.

The apparatus shown comprises, a housing 10 having a window 11 which may be closed by a cover 13 and a window 12 on the front face of the housing. There are located in the housing 10 an optical system 14 disposed at the entrance of a dark chamber 15, a roll 16 of photosensitive paper 17 guided and entrained by rollers 18, a lighting device 19 and a developing unit 20. The apparatus further comprises a second lighting device 21 disposed externally to the housing 10.

The optical system 14 comprises an objective lens 22 having an adjustable axial position and a plane mirror 23 articulated about a horizontal axis.

A selector lever 24 enables the linear and angular positions of the objective lens 22 and the mirror 23 respectively, to be adjusted and to be set in accordance with the different functions of the apparatus.

FIG. 1 is a diagrammatic representation of the apparatus ready for making photographic reproductions of a two-dimensional object (photocopies) placed in the plane of the window 11 on a transparent plate of glass. The lever 24 is raised, the objective lens is located at a certain distance from the paper surface 17 and the mirror is inclined at 45°. The optical system 14 is thus ready to form an image on the paper of the object having the same format as the latter. By pressing a button (not shown), voltage is applied to the lighting device 19 which lights up the object for a predetermined time interval in order to record the image formed on the film. The strip of paper then advances until it is replaced by a non-exposed film, while the surface which has an image formed on it is cut off by the scissors 25 and passes in a known way into the unit 20 where it is developed and made available to the user in a tray 26.

Figure 2:
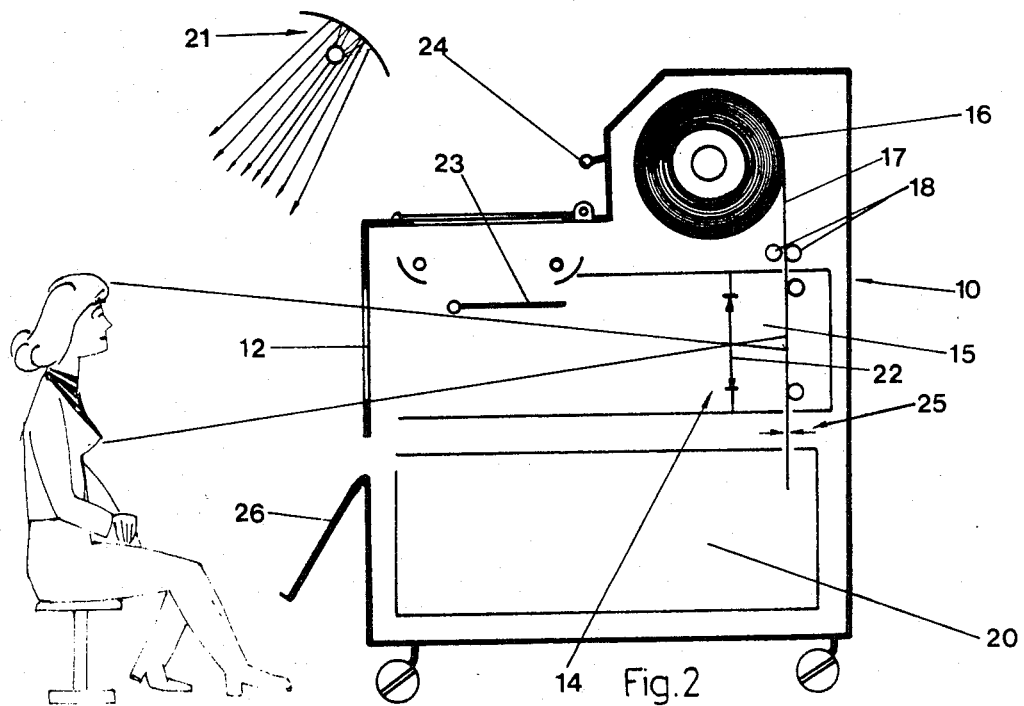
FIG. 2 is a similar view to that of FIG. 1 illustrating operation of the apparatus for producing photographs.

FIG. 2 shows the apparatus set to photograph a three-dimensional object, in this case the potrait of a person seated in front of and at acertain distance from the window 12. The lever 24 is lowered, the objective lens 22 is near the paper surface 17, and the mirror 23 is retracted.

The optical system is thus set to form an image of the object on the film unwound at the base or end of the dark chamber 15 in a standard format, for example postcard or identity photo. By pressing a button (not shown) voltage is supplied to the lighting device 21 which lights the object for a predetermined length of time in order ro record the image formed on the film. The operations described above are then repeated and the user may finally obtain his photo from the tray 26.

Intermediate positions of the lever 24 may be envisaged, corresponding for example to the reproduction of the subjects in two or three dimensions in reduced or enlarged formats.

Operation of the apparatus may be made subject to the introduction of a coin, a token, or a perforated card and the number of photos taken may be recorded by a counter.

The invention is evidently not limited to the embodiment shown in the drawings. For instance in a possible modification, the selector lever 24 is removed and replaced by push buttons or keys.

In addition the optical system may comprise several objective lenses to enable several identical or different photos to be taken simultaneously or successively on the same support.

It would also be possible to provide other settings of the optical system varying from those described, for example settings modifying the focal length of the objective lens and thus enabling the user to select the format of the reproduction, or to make several photos of the same object on the same support in different formats.

The apparatus could also be provided with electronic flashlight units or synchronisation sockets for independent flashlights.

Finally, there may be provided two films, one in monochrome, the other in colour, and means enabling the user to select either for both photocopies and photographs.

The apparatus may be actuated by an operator or may be completely automatic and, in this case, actuated by the introduction of a coin, a token, a card or a ticket.

The developing unit may comprise a chemical bath and a sensitive photographic support or a support sensitized before exposure or after exposure.

The developing unit may also be arranged to be able to transfer the image on an intermediate support to a further support which may be electrostatic, diazo, thermal, electronic, ionic or the like, or to use a direct or indirect support and of which the final support may be dry developed by an electrostatic, thermal, diazo, ionic or electronic support, or by a liquid or gaseous product.

I claim:

1. Multifunction reprographic apparatus for alternatively making a photocopy of a two-dimensional original or a photograph of a three-dimensional subject, said apparatus comprising a housing having front, top and rear walls, a first window in said front wall of the housing, a second window in the top wall of the housing, means positioning photosensitive paper vertically in said housing in front of said rear wall, an optical system comprising an objective lens for focusing an image on said photosensitive paper and a mirror movable between a first position in which an image of a 3-dimensional subject positioned in front of and spaced from said first window is directed by said objective lens onto said photosensitive paper and a second position in which an image of a 2-dimensional original placed on said second window is directed by said mirror and said objective lens onto said photosensitive paper, means in said housing for illuminating an original placed on said second window, and change-over means for moving said mirror between said first and second positions and for moving said objective lens along its optical axis toward said photosensitive paper to change the size of the image and depth of field of said optical system when said mirror is moved from said second position to said first position.

2. Apparatus according to claim 1, in which said change-over means comprises unitary manually operable control means for moving said mirror between said first and second positions and for moving said objective lens between a first position for focusing a subject in front of said first window on said photosensitive paper and a second position for focusing an image of an original on said second window on said photosensitive paper.

3. Apparatus according to claim 1, in which said mirror is pivoted to swing about a horizontal axis between said first position in which said mirror is approximately horizontal and out of the path of light from a subject in front of said first window passing through said first window and said objective lens onto said photosensitive paper and said second position in which said mirror is inclined at an angle of approximately 45° to the horizontal to direct light from an original placed on said second window through said objective lens onto said photosensitive paper.

4. Apparatus according to claim 1, further comprising an opaque cover for said second window.

5. Apparatus according to claim 1, further comprising means for illuminating a subject placed in front of said first window.

6. Apparatus according to claim 1, in which said housing has a raised upper portion above and rearwardly of said second window, and in which a roll of photosensitive paper is rotatably supported in said raised upper portion of said housing and means is provided for feeding photosensitive paper from said roll downwardly in front of said rear wall of the housing into position to receive an image through said optical system.

* * * * *